United States Patent [19]

Yamamoto

[11] Patent Number: 5,569,087
[45] Date of Patent: Oct. 29, 1996

[54] TORSIONAL VIBRATION DAMPENING DEVICE HAVING MULTIPLE SLIDER MECHANISMS TO PROVIDE MULTIPLE DAMPENING FORCE LEVELS

[75] Inventor: Kozo Yamamoto, Daito, Japan

[73] Assignee: Kabushiki Kaisha Daikin Seisakusho, Osaka, Japan

[21] Appl. No.: 334,084

[22] Filed: Nov. 4, 1994

[30] Foreign Application Priority Data

Nov. 10, 1993 [JP] Japan .................. 5-060451 U

[51] Int. Cl.⁶ ........................................ F16D 3/80
[52] U.S. Cl. ................................. 464/24; 464/66
[58] Field of Search .................... 464/24, 66, 68; 192/208, 212, 55.4, 70.17, 106.2; 74/574

[56] References Cited

U.S. PATENT DOCUMENTS

| | | | |
|---|---|---|---|
| 5,180,044 | 1/1993 | Fukushima et al. | 464/66 X |
| 5,353,664 | 10/1994 | Yamamoto | 192/55.4 X |
| 5,355,747 | 10/1994 | Kajitani et al. | 192/208 X |
| 5,367,921 | 11/1994 | Fukushima | 192/208 X |
| 5,386,896 | 2/1995 | Matsuoka | 192/208 X |

*Primary Examiner*—Daniel P. Stodola
*Assistant Examiner*—Eileen A. Dunn
*Attorney, Agent, or Firm*—Shinjyu Office of Patent Attorneys

[57] ABSTRACT

The device relates to a viscous torsional vibration dampening device for a flywheel mechanism and includes a flywheel (1), drive plates (14), driven plates (15), and a fluid filled chamber housing 18. The drive plates 14, the chamber housing and the flywheel are coupled to one another and rotate together. Within the chamber housing is a first slider cap (30) that forms a first choke between an inner surface of the chamber housing and is arranged to freely move circumferentially inside the liquid chamber. With the first slider cap (30) is a second slider cap (31). The second slider cap (31) is arranged to freely move circumferentially within the confines of the first slider cap (30). A second choke is defined between an inner surface of the first slider cap and an outer surface of the second slider cap that has a fluid path area smaller than that of the first choke. Another surface of the second slider cap (31) and an outer surface formed on the driven plates (15) defines a third choke that has a fluid path area larger than the second choke. The second slider cap (31) is also provided with a mechanism to prohibit relative rotation between the cap (31) and the driven plates (15) beyond an angular displacement range.

9 Claims, 6 Drawing Sheets

5,569,087

TORSIONAL VIBRATION DAMPENING DEVICE HAVING MULTIPLE SLIDER MECHANISMS TO PROVIDE MULTIPLE DAMPENING FORCE LEVELS

BACKGROUND OF THE INVENTION

The invention relates to a torsional vibration dampening device employed in, for instance, a split flywheel having a first and a second flywheel connected for limited angular displacement therebetween, where the dampening device absorbs vibrational energy during relative displacement of the two flywheels. In particular, the dampening device relates to a torsional vibration dampening device having a slider mechanism which partially defines three chokes, each choke allowing fluid flow which provides dampening for relative displacement between the two flywheels, and each choke providing differing degrees of dampening.

DESCRIPTION OF THE RELATED ART

Torsional vibration dampening devices are devices that, upon displacement of two flywheels in a split flywheel construction, allow for the flow of fluid between two cavities formed between the two flywheels and utilize the resistive force of a fluid choke to restrict viscous fluid flow between the cavities in order to dampen torsional vibrations. For example, such dampening devices are used in flywheels disposed between the engine of an automobile and the clutch assembly.

In this type of torsional vibration dampening device, it is desirable to have several levels of fluid flow resistive force for effectively dampening the various vibrational conditions which may be experienced by an automotive flywheel. Namely, a small resistive force is effective for small torsional vibrations which are the source of unusual noises during idling of an engine while a large resistive force is effective for dampening low-frequency vibrations occurring when the accelerator pedal is suddenly stepped on and released (tip-in and tip-out).

Conventional torsional vibration dampening devices are equipped with a first choke that generates a small resistive force in a small torsional angle range of displacement between the first flywheel and second flywheel, and a second choke that generates a large resistive force in response to a large torsional angle displacement range between the first flywheel and second flywheel.

In the structure of conventional torsional vibration dampening devices, the resistive force in the first choke must be made as small as possible in order to absorb minute vibrations while the engine is idling. Conversely, the resistive force in the second choke must be made large in order to sufficiently absorb low-frequency vibrations. Because of this, during a transition between the operation of the first choke to the operation of the second choke in a conventional device, the resistive force changes suddenly. The characteristics or response from the sudden change in resistive force, results in a shock generated when a tip-in—tip-out of acceleration is applied. In other words, when a driver of an automobile equipped with such a device presses suddenly on the accelerator and/or suddenly releases the accelerator, a shock or jolt is felt within the automobile.

SUMMARY OF THE INVENTION

One of the purposes of this invention is to reduce the shock experienced when a sudden change in torque is applied to a flywheel by gradually changing the resistive force in the dampening device of the flywheel.

The invention relates to a torsional vibration dampening device disposed between two flywheels, the flywheels coupled to one another for limited angular displacement therebetween. The first flywheel is formed with a recess provided with at least one fluid filled chamber partially covered by the second flywheel. The dampening device is disposed within the recess and includes an input rotor connected to the first flywheel, an output rotor configured for limited relative rotation with respect to the input rotor and coupled to the second flywheel. A first sliding part disposed within the fluid filled chamber, is formed with an internal containment portion and configured for limited radial movement in a circumferential direction within the fluid chamber, a surface of the first sliding part and a surface of the chamber defining at least a portion of a first choke which allows for fluid flow between portions of the fluid chamber.

A second sliding part disposed within the internal containment portion of the first sliding part, having means engagable with a portion of the output rotor allowing for limited displacement of the first sliding part within the first sliding part and limited displacement with respect to the output rotor, at least one surface of the second sliding part and one surface of the internal containment portion defining a second choke which allows for fluid flow between portions of the chamber housing, a portion of the second sliding part and a portion of the output rotor defining a third choke which allows for fluid flow between portions of the chamber.

Upon angular displacement of the rotors, viscous fluid in the chamber is forced to pass from one portion of the chamber to a second portion of the chamber through the third choke, the third choke providing a small resistive force due to the passage of the viscous fluid. Upon further angular displacement of the rotors, fluid is forced to pass through the second choke. The second choke produces a resistive force larger than the resistive force provided by the third choke. Further displacement causes fluid to pass through the first choke. The third choke providing a resistive force larger than the resistive force of either the first or second choke.

In one embodiment, the output rotor is formed with a radially extending protrusion formed on an outer radial surface. The second sliding part is formed with an internal containment portion wherein the protrusion extends into the second sliding part internal containment portion allowing limited displacement between the second sliding part and the output rotor.

In an alternate embodiment, the output rotor is formed with a recess on an outer radial surface. Further, the second sliding part is formed with a radially inwardly extending protrusion wherein the second sliding part protrusion extends into the output rotor recess allowing limited displacement between the second sliding part and the output rotor.

In yet another embodiment, the chamber is a separate housing attached to the first flywheel.

DETAILED DESCRIPTION OF THE PREFERRED EMBODIMENTS

Figure 1:
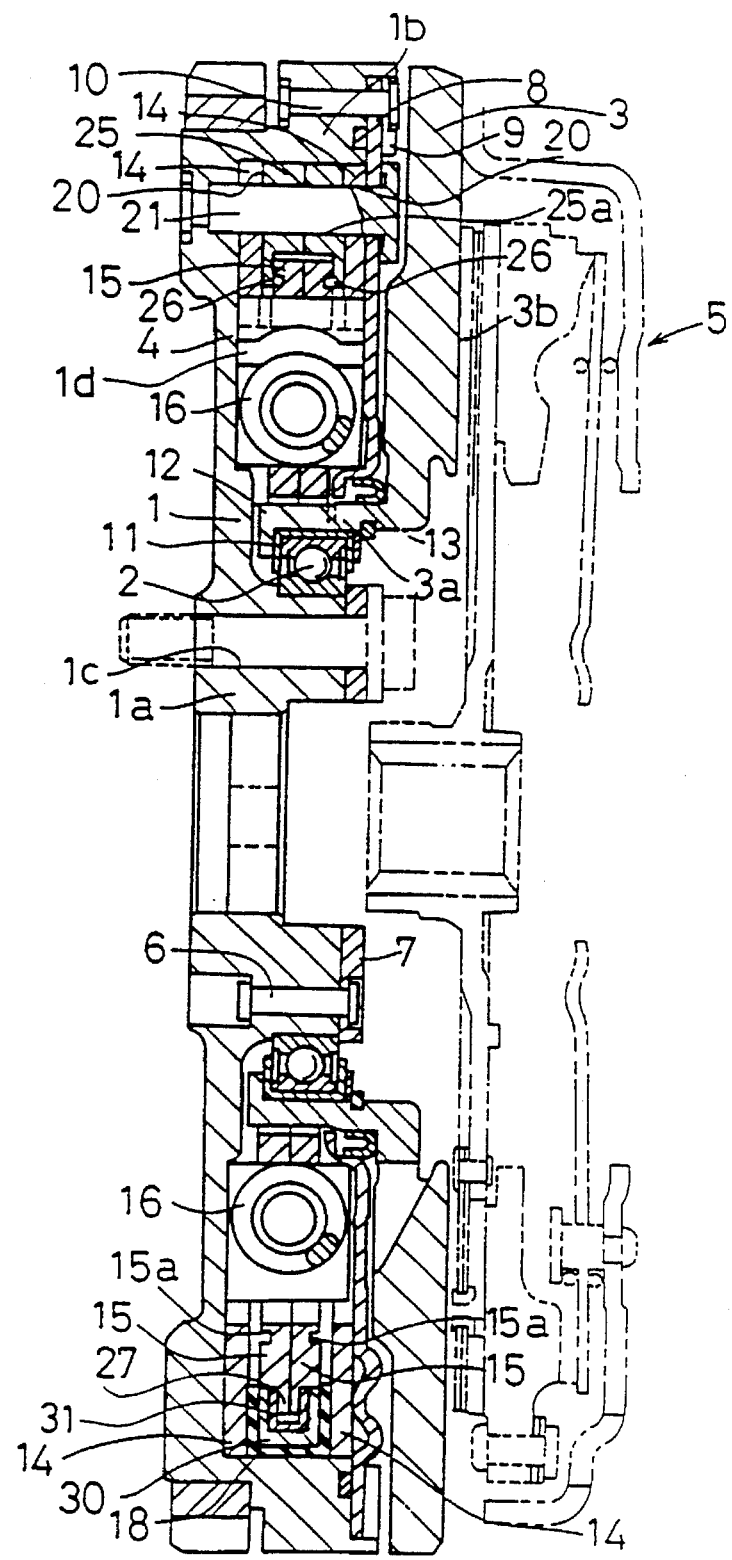
FIG. 1 is a cross-section side view of a first embodiment of the device of the present invention.

These and other objects, features, aspects and advantages of the present invention will become more fully apparent from the following detailed description of the present invention when taken in conjunction with the accompanying drawings where like reference numerals denote corresponding parts throughout, in which a split flywheel used in a first embodiment of the present invention is shown in FIG. 1. The split flywheel includes a first flywheel (1) and second flywheel (3) coupled together for limited rotary displacement therebetween via a bearing (2). A damper mechanism (4) is disposed between the first flywheel (1) and the second flywheel (3). A clutch (5) is mounted on the second flywheel (3).

The first flywheel (1) is fixed on the shaft-end of the crankshaft of, for instance, an internal combustion engine. The first flywheel (1) is roughly a disc shape and has central boss part (1a) and an outer peripheral annular wall (b) extending toward the second flywheel (3). Further, an annular concave recess (1d) is formed between the boss part (1a) and the outer peripheral annular wall (1b) to contain the damper mechanism (4). Bearing (2) is mounted at the outer periphery of the boss part (1a). Bearing (2) is fixed to the first flywheel by a plate (7) which is fixed by rivet (6) at the end of boss part (1)a. Bearing (2) has seal material at both sides that provides a lubricating seal. Thermal insulation (11) is arranged between the boss part (3a) to insulate the clutch (5) side against heat. Thermal insulation (11) makes contact with the outer race of bearing (2) only and does not touch the inner race. A bolt is provided that penetrates hole (1c) to fix this flywheel part to the crankshaft. Also, on the side of the first flywheel (1) facing the second flywheel (3), a stopper plate (8) and sub-plate (9) are arranged to mount damper mechanism (4) to the inside of the first flywheel (1). These plates (8) and (9) are fixed to the end of the outer peripheral annular wall (1b) of the first flywheel (1) by rivet (10).

Figure 2:
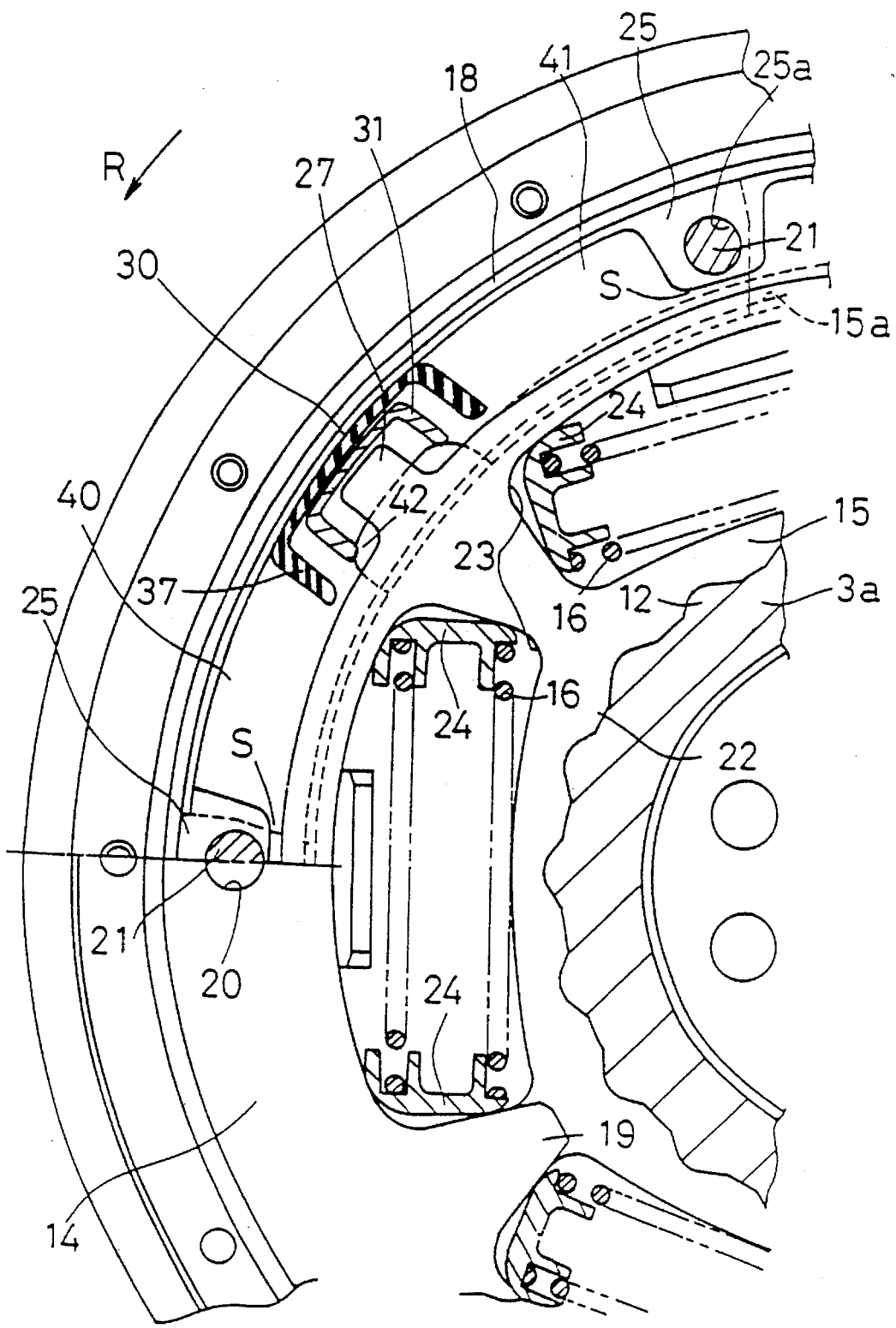
FIG. 2 is a fragmentary partial section end view of the embodiment of the present invention depicted in FIG. 1.

The second flywheel (3) is roughly a disc shape and has boss part (3a) located at the center protruding toward the first flywheel (1) side. Further, bearing (2) is mounted at the inner peripheral of boss part (3a). As shown in FIG. 2, in boss part (3a), wave-like teeth (12) are formed that couple with the output part of damper mechanism (4) for the outer peripheral part of the leading edge side of first flywheel (1). For the base of boss part (3), a seal material (13) is arranged to seal the viscous fluid inside the damper mechanism (4) between boss part (3a) and the outer periphery of the stopper plate (8). Further, the end of second flywheel (3) adjacent to the clutch (5), is a friction surface (3b) which contacts a clutch disk (shown in phantom), and in response to pressure from the clutch (5) engages the friction material of the clutch disk.

The damper part (4) is disposed within the region defined by the recess (1d) of the first flywheel (1), the sub-plate (8) and the boss part (3a) of the second flywheel. The damper part (4) is also filled with a viscous fluid. Damper part (4) includes a pair of drive plates (14), and a pair of driven plates (15) arranged inside the pair of drive plates (14), a torsion spring (16) flexibly coupled to both plates (14) and (15), and a liquid chamber housing (18) that forms the liquid chamber.

The drive plates (14) are a ring shaped material and have a plurality of protruding parts (19) that protrude radially inwardly and are spaced apart, as shown in FIG. 2. There is a spacer in the area next to protruding part (19) that contains torsion spring (16).

A plurality of apertures (20) are formed in the drive plates (14). Securing pins (21) are inserted into the apertures (20) and, as shown in FIG. 1, secure part (25) of a liquid chamber housing (described below), the pair of drive plates (14) and a stopper plate (8) to the first flywheel (1).

The driven plates (15) are formed with a ring shape and, as shown in FIG. 2, have wave-like teeth (22) at an inner radial edge. These wave-like teeth (22) mesh with the wave-like teeth (12) formed in the second flywheel (3). This meshing causes the driven plates (15) and the second flywheel (3) to rotate integrally. Moreover, for the driven plates (15), plurality of openings (23) are formed that separate the rotation direction and extend it circumferentially. These openings (23) correspond to the space between the protruding parts (19) on the drive plates (14). A torsion spring (16) is contained within the space formed by the openings (23) and the protruding parts (19). As shown in FIG. 2, the torsion spring (16) makes contact at both ends of the openings (23) in the circumferential direction via a spring seat (24). However, as shown in FIG. 2, when the damper mechanism (4) is in a torsion free state (i.e. there is no relative displacement between the first and second flywheels) only the outer peripheral edge part of the spring seat (24) makes contact at both ends of the openings (23). In other words, the torsion spring (16) is contained in within the openings (23) in a state in which contact is made at one end to the opening (23) and at the other end with the protruding part (19).

The outer peripheral part of the driven plates (15) are provided with a plurality of projections (27) which are positioned in correspondence with the solid portion of the driven plates (15) between the openings (23). The projections (27) protrude in a radially outward direction.

The previously mentioned liquid chamber housing (18) is fixed to the first flywheel (1) and disposed between the pair of drive plates (14) radially outwardly with respect to the driven plates (15).

Figure 3:
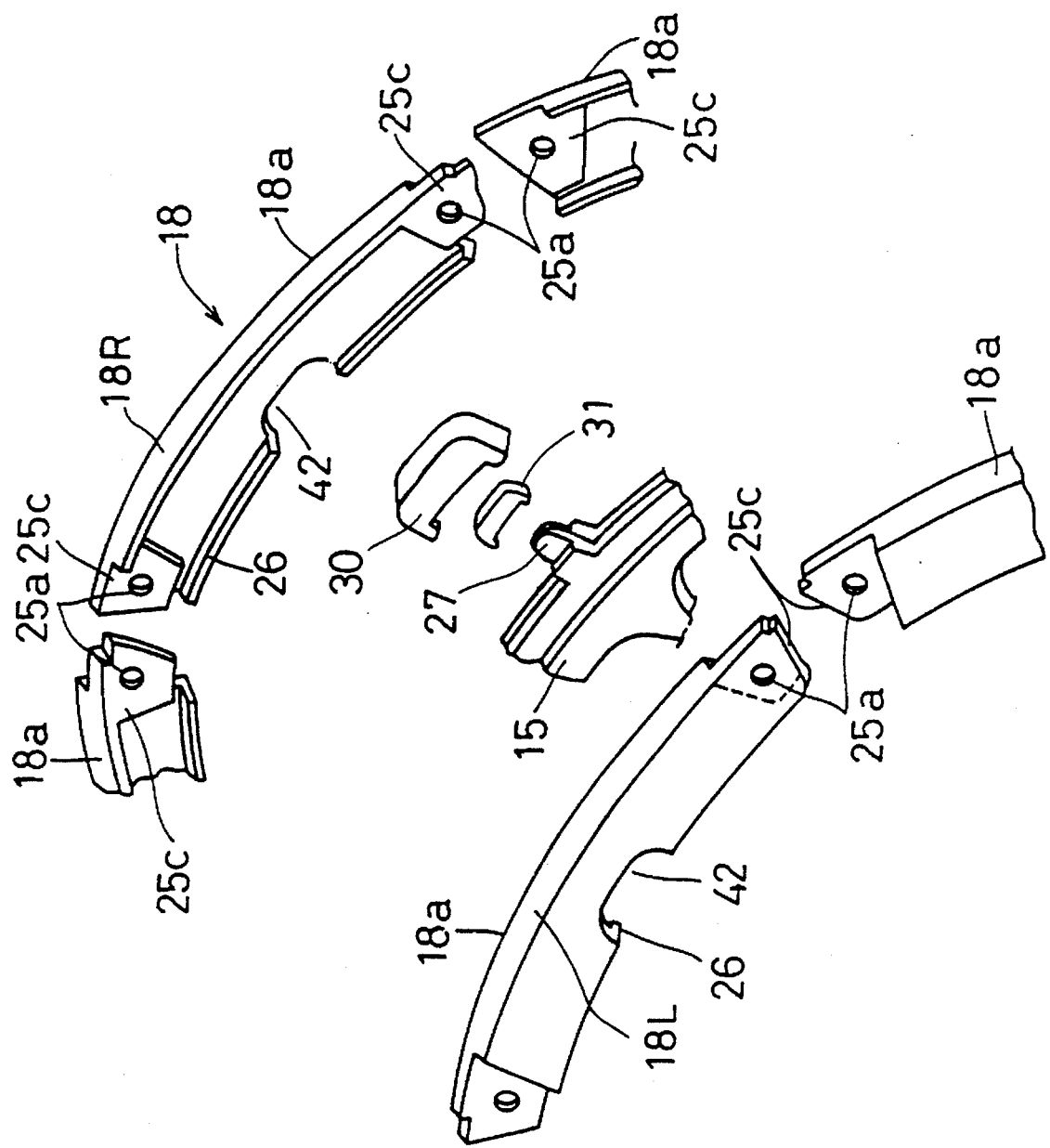
FIG. 3 is a fragmentary exploded perspective view of a liquid chamber housing employed in the device depicted in FIGS. 1 and 2.

As shown in FIGS. 2 and 3, the liquid chamber housing (18) has plurality of dam portions (25) that are separated in the circumferential direction. An aperture (25a) is formed in the dam part (25) and a fixing pin (21) is inserted inside the hole (25a). Moreover, as shown in FIG. 3, the liquid chamber housing (18) includes a left section (18L) and a right section (18R). As well, five pairs of sections (18R) and (18L) are disposed within the recess (1d) of the flywheel (1). Namely, the liquid chamber housing (18) consists of a total of ten circular arc shaped housing portions. At each end of each housing part (18R) and (18L) in the circumferential direction a dam part (25c) is formed that forms the dam part (25). The dam part (25c) corresponding to the adjacent pair of housing assemblies (18a) overlap and are coupled by fixing pin (21). This overlap and coupling assembles the liquid chamber housing (18) in an annular shape and also couples it to the drive plates (14).

A pair of annular projections (26) are formed in the inward direction from the liquid chamber housing (18). These annular projections (26) seal the liquid chamber by fitting into the annular grooves (15a) formed on the driven plates (15).

Figure 4:
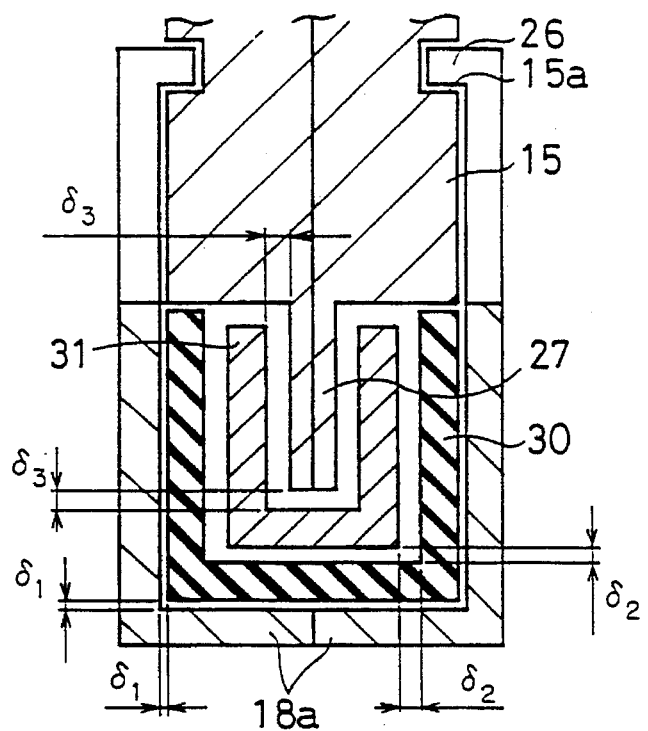
FIG. 4 is a fragmentary section of a portion of FIG. 1, on a slightly enlarged scale.
Figure 5:
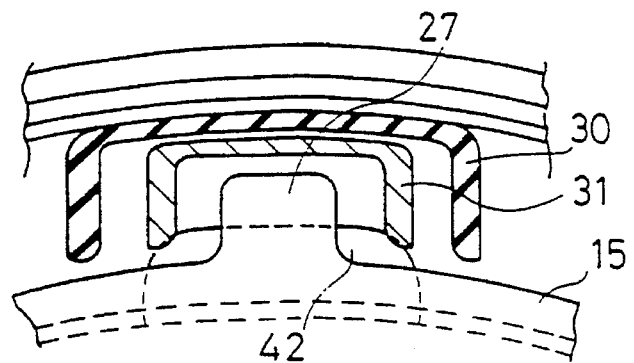
FIG. 5 is a fragmentary section of a portion of FIG. 2.

As shown in FIG. 3, inside the fluid chamber formed by the liquid chamber housing (18), a first slider cap (30) is arranged to freely slide circumferentially. The first slider cap (30) is formed in a box shape that opens to the inner side and is arranged such that the protruding part (27) of the driven plates (15) extends inside the cap (30). The outer peripheral wall in the outward direction from the first slider cap (30) is formed in a circular arc shape following the inner peripheral wall surface of the liquid chamber housing (18). As is shown in FIG. 4, between the first slider cap (30) and the liquid chamber housing (18) gap $\delta 1$ is formed. The gap $\delta 1$ defines a first choke, as will be explained further below.

A second slider cap (31) formed in the same general shape as the first slider cap (30) is arranged inside the first slider cap (30). The second slider cap (31) freely slides circumferentially inside the first slider cap (30). Further, the protruding parts (27) of the driven plates (15) are inside each of the second slider caps (31). As is shown more clearly in FIG. 4, between the second slider cap (31) and the first slider cap (30) gap $\delta 2$ is formed. The gap $\delta 2$ defines a second choke. The gap $\delta 2$ is larger than the gap $\delta 1$ which results in the flow path area of the second choke being wider than the flow path area of the first choke. Between the second slider cap (31) and the protruding part (27) of the driven plates (15) gap $\delta$ is formed. The gap $\delta$ defines a third choke. The gap $\delta$ is larger than the gap $\delta$ which results in the flow path area of the third choke being wider than the flow path area of the second choke.

A groove (42) is formed in each chamber portion (18L) and (18R). The groove (42) is formed at approximately the center of the portions (18R) and (18L) between adjacent dam parts (25) and when there is no relative displacement between the first and second flywheels (i.e. the engine is not running), the groove (42) shifts generally to the center relative to the first and second slider caps (30), (31), and the protruding part (27) of the driven plates (15).

A main choke (S) is defined between an outer radial surface of the driven plates (15) and the inner radial portion of the dam (25). The main choke allows fluid communication between side-by-side large chambers (40) and (41) which are formed between the inside peripheral edge of the dam part (25) and the outer edge of the driven plates (15). The main choke (S) further defines the first choke along with gap $\delta$. The flow path area of the first choke with this additional main choke (S) is narrower than the flow path area of the second choke.

The operation of the above described embodiment will now be explained. When a torque is generated, either by the engine attached to the first flywheel (1) or the clutch 5 (due to downshifting) the drive plates (14) are displaced in either a forward rotation direction or a reverse rotation direction relative to the driven plates (15). If a small displacement angle between the plates (14) and the plates (15) is experienced, in a small displacement angle range, the torsion spring (16) is compressed in an uneven contact state. Consequently, the fluid viscous damper mechanism exhibits a small torsional rigidity.

When the torsion angle becomes large, the torsion spring (16) is compressed in an even contact state. Consequently, the fluid viscous damper mechanism exhibits a large torsional rigidity.

Figure 6:
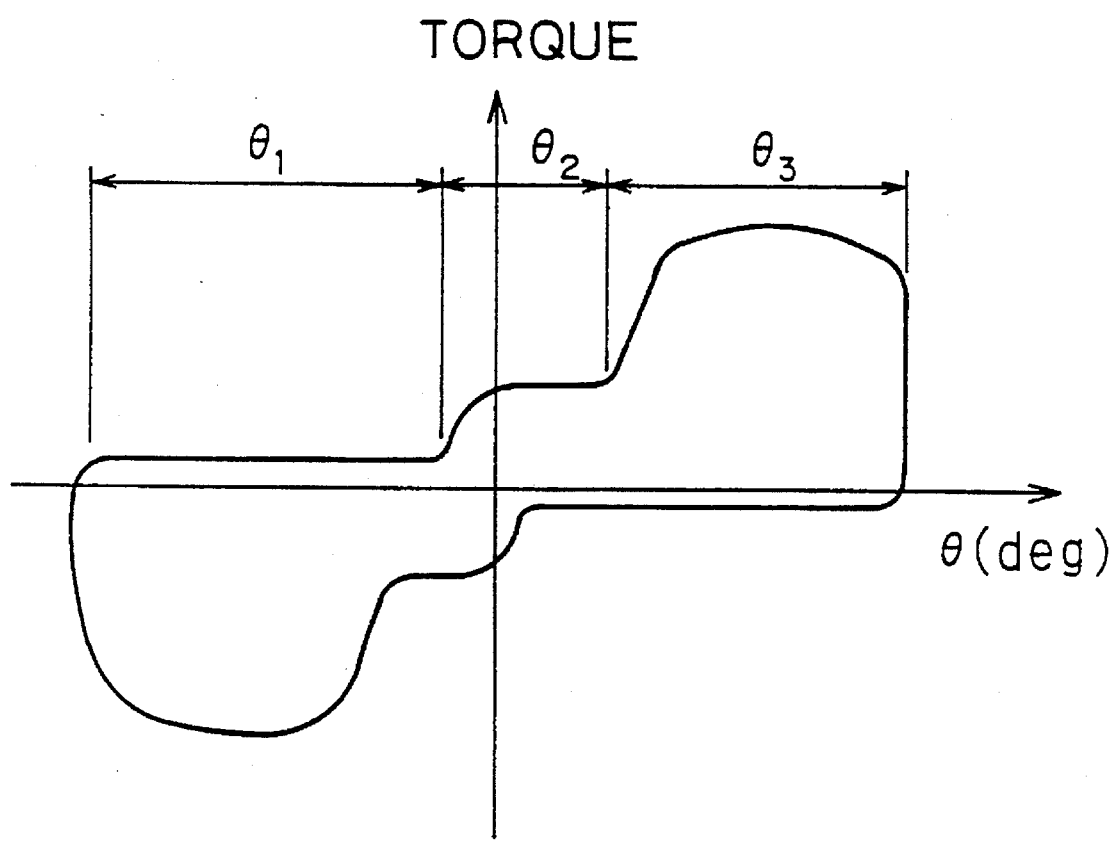
FIG. 6 is a viscous torsion characteristic curve diagram showing dynamic characteristics of the first embodiment of the present invention.

When torque is generated, if the displacement angle between the first flywheel (1) and the second flywheel (3) is relatively small, the viscous fluid within chambers flows through the third choke which has the largest flow path area. Namely, the viscous fluid inside the fluid chamber flows via the gap $\delta 3$ between the protruding part (27) of the driven plates (15) and the second slide cap (31). In this case, since the flow path area is large the resistive force created while the viscous fluid flows therethrough is small, as is shown in FIG. 6 represented by the angle range $\theta 1$.

If the torque becomes larger, the torsion angle between the input and output sides also become larger. In this case, the protruding part (27) of the driven plates (15) makes contact with the second slide cap (31) and they are displaced together due to physical engagement. In this situation, the third choke is closed due to the contacting surfaces the protruding part (27) and the slide cap (31). Further, when the second slide cap (31) and the driven plates (15) are displaced integrally, torsion occurs between them and the first slider cap (30). When this occurs, the viscous fluid inside the adjacent fluid chambers flows via the gap $\delta 2$ between the first slider cap (30) and the second slider cap (31) or the second choke. Since the flow path area of the second choke is narrower than the surface area of the third choke, the resistive force created due to fluid flow through the second choke is greater than the force created by the flow of fluid through the third choke. The force created by the second choke is represented in FIG. 6 within angle range $\theta 2$.

As the twisting torque becomes even larger, the driven plates (15) and the second slider cap (31) make contact with the radial edges of the slider cap (30) and these three elements are displaced or rotate integrally. At this point the second choke is closed due to the contacting surfaces of the sliders (30) and (31). When this occurs, the viscous fluid inside the fluid chamber flows through the gap $\delta 3$ between the first slider cap (30) and the liquid chamber housing (18) and the main choke (S) or the first choke. Since the flow path area of the first choke is the narrowest, the resistive force of the viscous fluid while the flowing through the first choke is greater than the force created by the flow of fluid through the second choke. Consequently, the characteristics shown in FIG. 6 within angle range $\theta 3$ are exhibited.

The above explanation of the operation of the invention demonstrates that the viscous fluid flows through the second choke after the third choke closes and that the viscous fluid flows through the first choke after the second choke closes but, it should be understood that there may also be an instance where, depending on the settings of the flow path surface area of each choke, the viscous fluid flows through the second choke before the third choke closes and the viscous fluid flows through the first choke before the second choke closes.

In this embodiment, with the increase of the torsion angle, the resistive force of the viscous fluid flowing through each choke increases while it gradually changes. Therefore, shocks become difficult to occur.

Figure 7:
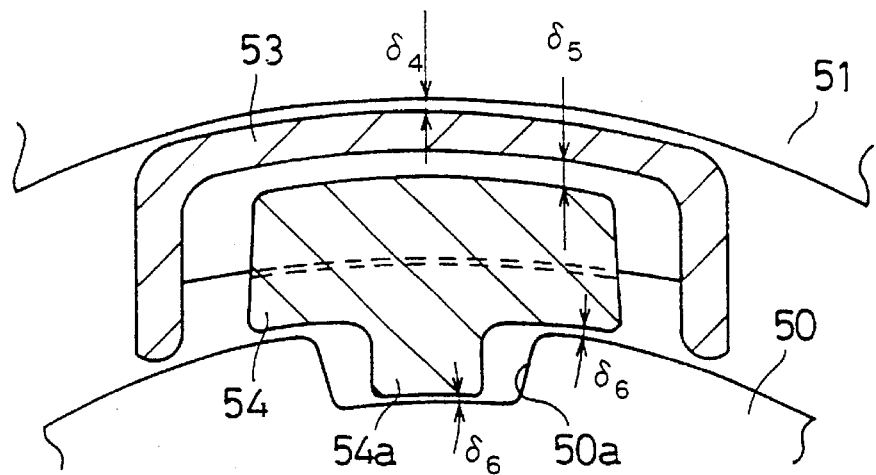
FIG. 7 is view similar to FIG. 5 of a second embodiment of the present invention.
Figure 8:
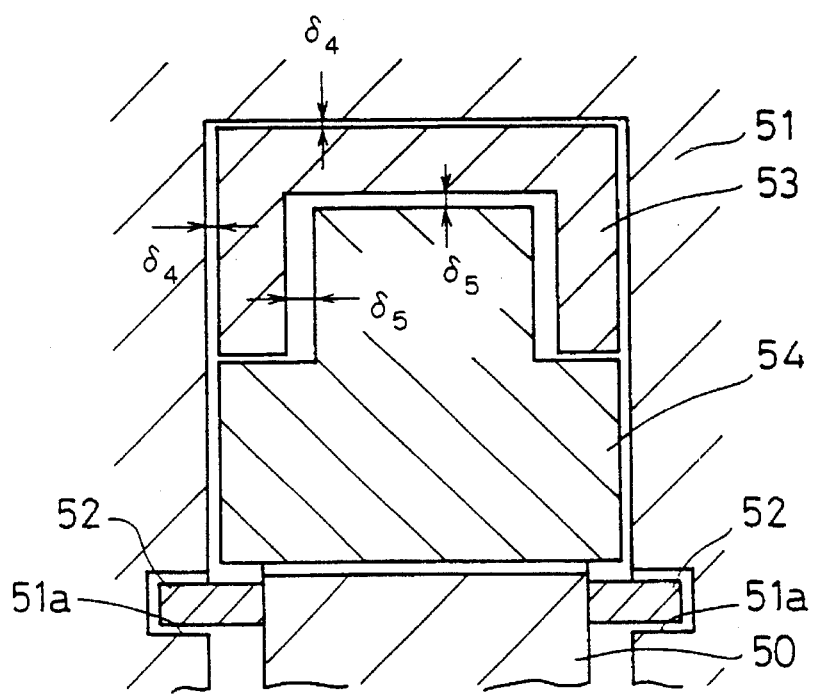
FIG. 8 is view similar to FIG. 4 of the second embodiment of the present invention.

In a second embodiment shown in FIGS. 7 and 8, a driven block (50) is employed in place of the driven plates (15). A fluid chamber is also formed by the driven block (50) and a liquid chamber housing (51).

The liquid chamber housing (51) can be formed by an integrated material in a manner similar to the housing (18), or may be formed by a portion of the first flywheel (1) and other material. A seal groove (51a) is formed at the wall of the liquid chamber housing (51). Seal material (52) is inserted into the seal groove (51a) sealing a gap formed between the driven block (50) and the housing (51).

A slider cap (53) is arranged inside the liquid chamber to freely slide circumferentially. The slider cap (53) has a configuration similar to that of the first slider cap (30) in the first embodiment, above. Further, a slide block (54) is disposed inside the slider cap (53). A protruding part (54a) is formed on a middle lower surface of the slider block (54) that protrudes inwardly. Correspondingly, a concave part (50a) is formed on the driven block (50) opposite the protruding part (54a) of the driven block (50). The protruding part (54a) of the slider block (54) is inserted to freely move circumferentially in this concave part (50a). Consequently, the slider block (54) freely moves circumferentially within an angle range defined by the relative size of the concave part (50a).

A gap $\delta 4$ is defined between the slider cap (53) and liquid chamber housing (51) forming a first choke. Moreover, gap $\delta 5$ is defined between the slider cap (53) and the slider block (54) forming a second choke. The flow path surface area of the second choke is set larger than that of the first choke. Further, $\delta 6$ is formed between the slider cap (53) and the driven block (50). The gap $\delta 6$ forms the third choke. The flow path surface area of the third choke is set larger than that of the second choke.

In this embodiment, a small resistive force is generated by the viscous fluid flowing through the third choke in a small torsion angle range and as the torsion angle becomes larger, the viscous fluid flows through the second choke and the first choke which gradually increases the resistive force. Consequently, the response of displacement verses torque obtained is generally identical to the response obtained from the first embodiment.

In the embodiments described above, the various levels of resistive force may be altered or adjusted to fit the needs of a particular application of the invention. For instance, changes to the size of the gaps $\delta 1$ through $\delta 3$ or $\delta 4$ through $\delta 6$ may provide differing response characteristics from the present invention. Further, by modifying the size, shape and number of slider caps, the resistive force can be changed by four levels or more.

The device described above makes it difficult for shocks to occur by using a viscous fluid to gradually transfer resistive force.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A viscous torsional vibration dampening device for a flywheel mechanism, comprising:

an input rotor;

an output rotor configured for limited relative rotation with respect to said input rotor;

a chamber housing coupled to said input rotor for rotation therewith, said chamber housing defining a fluid chamber;

a first sliding part disposed within said fluid chamber, formed with an internal containment portion and configured for limited movement in a circumferential direction within said fluid chamber;

a second sliding part disposed within said internal containment portion of said first sliding part, a portion of said second sliding part being engagable with a portion of said output rotor, allowing for limited displacement of said second sliding part within said first sliding part and limited displacement with respect to said output rotor;

wherein a space between a surface of said first sliding part and a surface of said chamber housing defines at least a portion of a first choke, a space between at least one surface of said second sliding part and one surface of said internal containment portion defines a second choke, and a space between a portion of said second sliding part and a portion of said output rotor defines a third choke.

2. A viscous torsional vibration dampening device as set forth in claim 1, wherein said first choke is smaller than said second choke and said second choke is smaller than said third choke.

3. A viscous torsional vibration dampening device as set forth in claim 1, wherein said output rotor further comprises a radially extending protrusion formed on an outer radial surface thereof and said second sliding part further comprises an internal containment portion, said protrusion extending into said internal containment portion of said second sliding part and allowing limited displacement between said second sliding part and said output rotor.

4. A viscous torsional vibration dampening device as set forth in claim 1, wherein said output rotor further comprises a recess formed on an outer radial surface thereof and said second sliding part further comprises a radially inwardly extending protrusion, said second sliding part protrusion extending into said recess of said output rotor and allowing limited displacement between said second sliding part and said output rotor.

5. A viscous torsional vibration dampening device as set forth in claim 1, wherein said chamber housing is formed with a radially inwardly extending protrusion, and said first choke is further defined as a space between an outer radial surface of said output rotor and an inner radial surface of said protrusion.

6. A viscous torsional vibration dampening device as set forth in claim 1 wherein said input rotor comprises two disk-like members, each of said disk-like members being disposed on either side of said output rotor.

7. A viscous torsional vibration dampening device as set forth in claim 1 wherein said output rotor comprises a single disk-like member.

8. A viscous torsional vibration dampening device as set forth in claim 1, wherein said output rotor comprises two side-by-side disk-like members.

9. A viscous torsional vibration dampening device as set forth in claim 1 further comprising a flywheel formed with an annular recess, said chamber and said input rotor connected to said flywheel within said recess.

* * * * *